(12) United States Patent
Sutskover et al.

(10) Patent No.: US 7,929,598 B2
(45) Date of Patent: Apr. 19, 2011

(54) LOWER PROCESSING RATE DECISION FEEDBACK EQUALIZER FOR HIGHER RATE CARRIER SIGNAL

(75) Inventors: Ilan Sutskover, Hadera (IL); Yossi Erlich, Hod HaSharon (IL); Assaf Kasher, Haifa (IL)

(73) Assignee: Intel Corporation, Santa Clara, CA (US)

( * ) Notice: Subject to any disclaimer, the term of this patent is extended or adjusted under 35 U.S.C. 154(b) by 780 days.

(21) Appl. No.: 11/968,075

(22) Filed: Dec. 31, 2007

(65) Prior Publication Data

US 2009/0168865 A1 Jul. 2, 2009

(51) Int. Cl.
*H03H 7/40* (2006.01)
*H03H 7/30* (2006.01)
*H04B 1/10* (2006.01)

(52) U.S. Cl. .................. 375/233; 375/231; 375/350

(58) Field of Classification Search .......... 375/229–233, 375/285, 346, 348, 350; 333/28 R, 18; 708/300, 708/322, 323
See application file for complete search history.

(56) References Cited

U.S. PATENT DOCUMENTS

| 6,370,191 B1 * | 4/2002 | Mahant-Shetti et al. ..... 375/233 |
| 2008/0080612 A1 * | 4/2008 | Garth et al. ................... 375/233 |

OTHER PUBLICATIONS

David Falconer et al., "Frequency Domain Equalization for Single-Carrier Broadband Wireless System," IEEE Communications Magazine, Apr. 2002, pp. 58-66.*

* cited by examiner

*Primary Examiner* — Tesfaldet Bocure
(74) *Attorney, Agent, or Firm* — Cool Patent, P.C.

(57) ABSTRACT

Briefly, in accordance with one or more embodiments, parallel DFE processing may be utilized for single carrier systems that employ cyclic prefixes. The achieved parallelism allows working at contemporary clock rates that are significantly lower than the required sampling rate at high bandwidth systems such as 60 GHz transmissions.

20 Claims, 4 Drawing Sheets

LOWER PROCESSING RATE DECISION FEEDBACK EQUALIZER FOR HIGHER RATE CARRIER SIGNAL

BACKGROUND

Communication using a 60 GHz carrier is being proposed for implementation in higher data rate systems. Standardization efforts are emerging in entities such as the Institute of Electrical and Electronics Engineers (IEEE) 802.15.3c standard and in European Computer Manufacturers Association (ECMA) standards. In ECMA, single carrier (SC) is the method of choice for simple devices operating in the 60 GHz band. In IEEE 802.15.3c, several optional physical layer methods have been accepted, one of them is SC and another is OFDM.

Multipath channels require equalization for reducing the inter-symbol interference (ISI) effect. In SC systems, channel equalization is typically done using a decision feedback equalizer (DFE) that includes a feed-forward part using a linear filter as a feed-forward equalizer (FFE) followed by a decision feedback section. Feed-forward equalizers may be implemented either in the time domain or in the frequency domain. In the time domain, this is typically done by a linear filter operating at the sampling frequency. Such an arrangement may require assignment of multipliers proportional to the delay spread of the channel. In contrast, a frequency domain equalizer (FDE) may perform a fast Fourier transform (FFT), correct the gains in the frequency domain, and then perform inverse FFT back to the time domain. Such an arrangement is capable of handling various types of multipath channels and for medium-to-long delay spread sizes the complexity is smaller compared to time domain FFEs.

Frequency domain equalizers appear to be included as part of the proposals in IEEE 802.15.3c. However, the FFT may require that the channel will circularly affect the transmitted signal such as commonly utilized in OFDM systems, for example, where a cyclic prefix may be attached to the transmitted symbol. FDEs for single carrier systems may also use a proper prefix for creating this circular effect, and there are two methods for doing so. One is by utilizing a regular cyclic prefix wherein the contents of the suffix are also attached as a prefix. Another is by utilizing a predetermined sequence which may be attached between every two blocks. By keeping the size of the block with a predetermined sequence, including the prefix, as a power of 2, FFT treatment may be implemented. When a regular cyclic prefix is considered, the block size exclusive of the prefix may have a length that is a power of two.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 1:
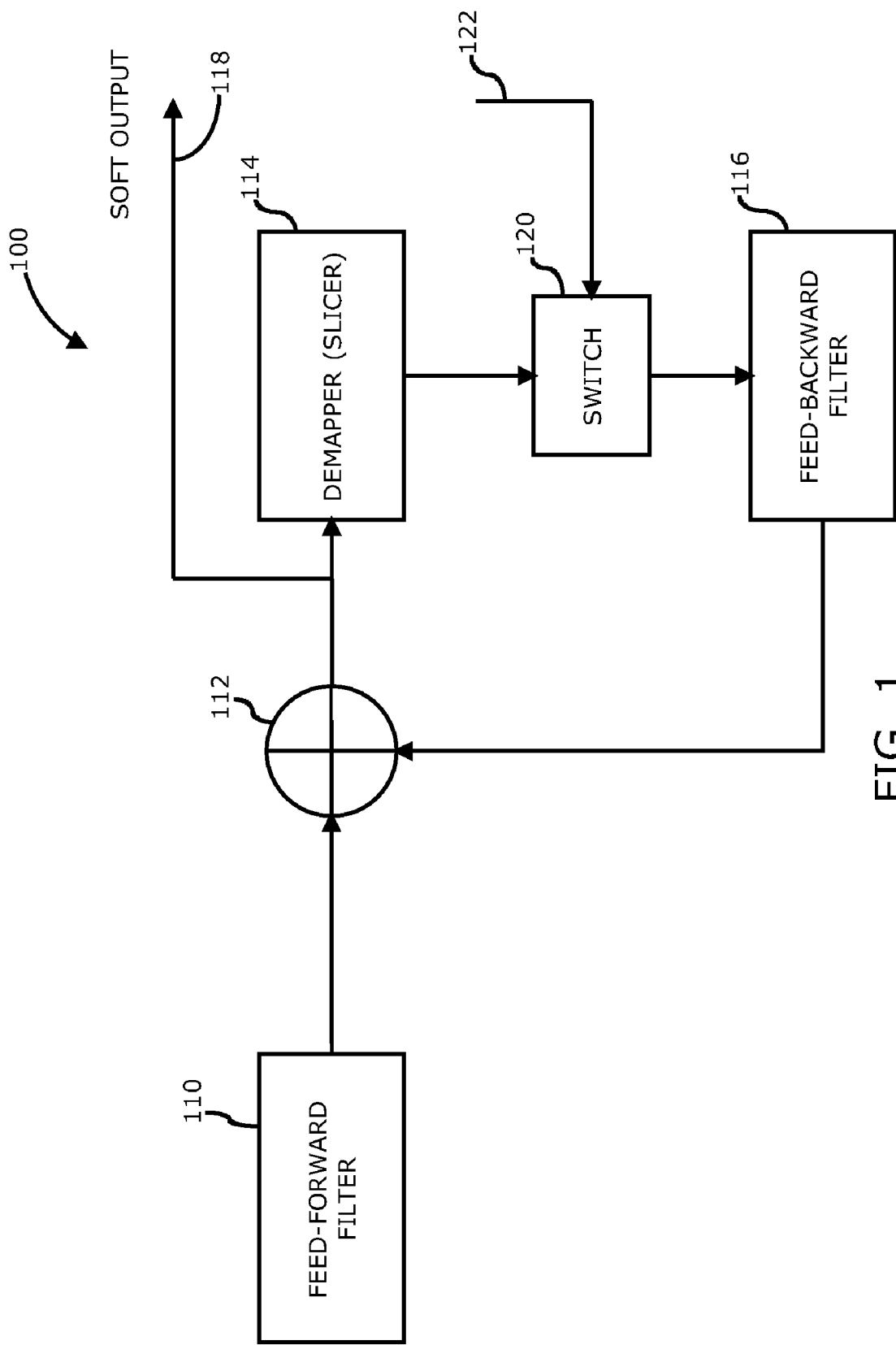
FIG. 1 is a block diagram of a decision feedback equalizer (DFE) in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. However, "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Referring now to FIG. 1, a block diagram of a decision feedback equalizer (DFE) in accordance with one or more embodiments will be discussed. The decision feedback equalizer (DFE) processor 100 may generally have the architecture shown in FIG. 1 comprising a feed-forward filter (110) having an output applied to the input of a demapper (slicer) block 114 via a summing element 112. The output of the demapper (slicer) block 116 is fed back to summing element 112 via a feed-backward filter 116, and the soft output 118 of DFE processor 100 is taken off the output of summing element 112. In some embodiments, the coefficients of feed-forward filter 110 and/or feed-backward filter 116 may implement on-the-fly adaptation of coefficients, and in other embodiments such as where a preamble enables channel estimation, no such on-the-fly adaptation may be utilized. In one or more embodiments, feed-forward filter 110 may be implemented via a filter or alternatively via two fast-Fourier transforms (FFTs) and multiplication in the frequency domain, although the scope of the claimed subject matter is not limited in these respects.

Unlike feed-forward filter 110, feed-backward filter 116 may be inherently sequential in that a decision regarding a next sample may rely on a decision regarding the current sample or earlier samples. Thus, real-time implementation of DFE processor 100 typically involves executing slicing at the baud rate. However, when the baud rate is higher than the system clock, or if the sum of the inherent delays in the computing blocks exceeds the clock duty cycle, such an implementation of DFE 100 may not be practical, and therefore linear equalization (FFE) only has been utilized, resulting in degraded receiver performance.

In one or more embodiments, a predetermined prefix may be utilized in conjunction with DFE processor 100, as parallelism of the process may be implemented to allow the data blocks to be processed in parallel since the known and predetermined cyclic prefix sequence may be utilized to supply the initialization for DFE processor 100. Such a parallel arrangement may be utilized in higher bandwidth systems such as the higher bandwidth expected in the 60 GHz domain. Parallel arrangements are utilized in higher bandwidth systems since the higher bandwidths result in higher sampling rates, for example a sampling rate on the order of 2 GHz is expected for 60 GHz systems. With parallel processing of eight blocks, as an example, the clock rate used for the digital circuits could be as low as approximately 250 MHz, which may be more feasible to implement than clock rates at about 2 GHz. Without such parallelism, either system rates such as 2 GHz may be required, or a degraded performance may be expected due to avoidance of the decision feed-backward filter 116 of DFE processor 100 wherein only feed-forward filter 110 would be used. However, these are merely example embodiments for DFE processor 100, and the scope of the claimed subject matter is not limited in these respects.

In one or more embodiments as shown in FIG. 1, DFE processor 100 may comprise a switch 120 coupled between an output of demapper (slicer) 114 and an input of feed-backward filter 120. By operation of switch 120, decisions from a previous demapper (slicer) from a previous DFE processor 100 in a parallel arrangement of multiple DFE processors may be fed into the feed-backward filter 116 of the present DFE processor 100 via input line 122, which may correspond to line 310 of FIG. 3, below in one or more embodiments. Thus, feed-backward filter 116 may receive initialization decisions, referred to as "initialization", from a previous demapper (slicer) 114 of a previous DFE processor 100 instead of receiving such decisions from its own demapper (slicer) 114 via switch 120, although the scope of the claimed subject matter is not limited in this respect.

Figure 2:
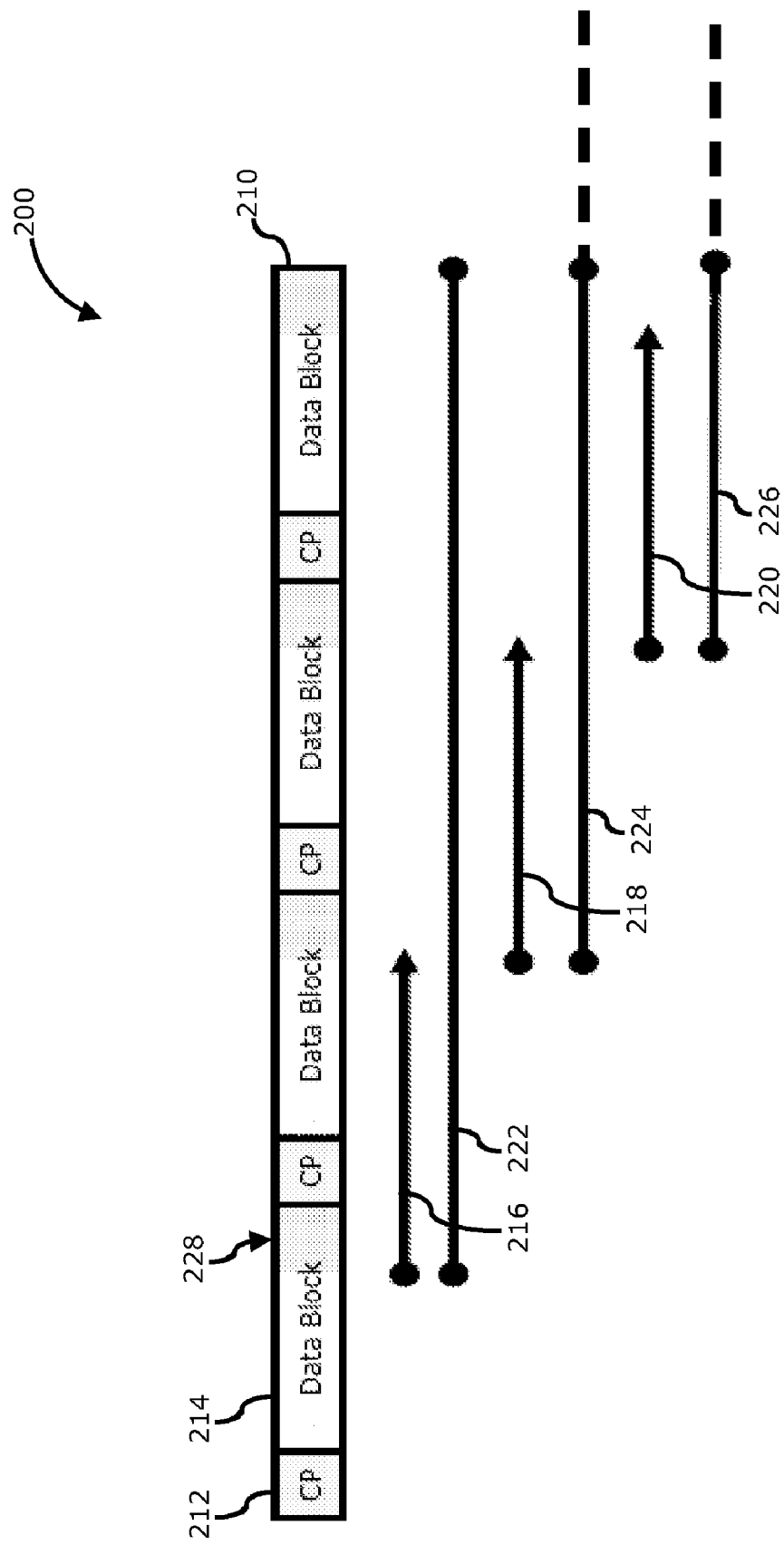
FIG. 2 is a diagram of a method for parallel DFE processing in the presence of cyclic prefixes in accordance with one or more embodiments.

Referring now to FIG. 2, a diagram of a method for parallel DFE processing in the presence of cyclic prefixes in accordance with one or more embodiments will be discussed. The method 200 as shown in FIG. 2 implements parallel DFE processing of a received signal 210 having cyclic prefixes 212 for corresponding data blocks 214 in which three parallel DFE processors are used for a delayed structure as an example. In one or more embodiments, a first DFE processor 100 processes the portion of received signal 200 corresponding to arrow 216, a second DFE processor 100 processes the portion of received signal 200 corresponding to arrow 218, and a third DFE processor 100 processes the portion of received signal 200 corresponding to arrow 220, and so on. The processing time allowed for each DFE processor 100 may be larger than a block time, typically by the parallelism factor which is three in the example shown. Thus, the processing time for the first DFE processor 100 may be represented by line 222, the processing time for the second DFE processor 100 may be represented by line 224, and the processing time for the third DFE processor 100 may be represented by lined 226, and so on.

In one or more embodiments, each DFE processor 100 begins by working on a block part where decision values are already known due to the previous DFE processor 100 wherein the transmitted constellation points 228 associated with the first processed samples are equal to the constellation points transmitted in the cyclic prefix part 212, and where the decisions regarding the cyclic prefix were obtained at an earlier stage from a previous DFE processor 100. When combined with a frequency domain equalizer (FDE) for the feed-forward filter 110, a delay of the size of the block may be utilized for the FFT to take place. Thus, in one or more embodiments, DFE processor 100 may start processing cyclic prefix 212 at least one sample before the constellation point 228 becomes available for the successive DFE processor 100. As a result, the processing rate of each DFE processor 100 can be lower than the sample rate by the parallelism factor. Thus, even with cyclic prefixes, by employing for example eight processors in a particular embodiment, no more than about a 250 MHz clock rate may be required to implement DFE to for 2 GHz symbol rate, although the scope of the claimed subject matter is not limited in this respect.

Figure 3:
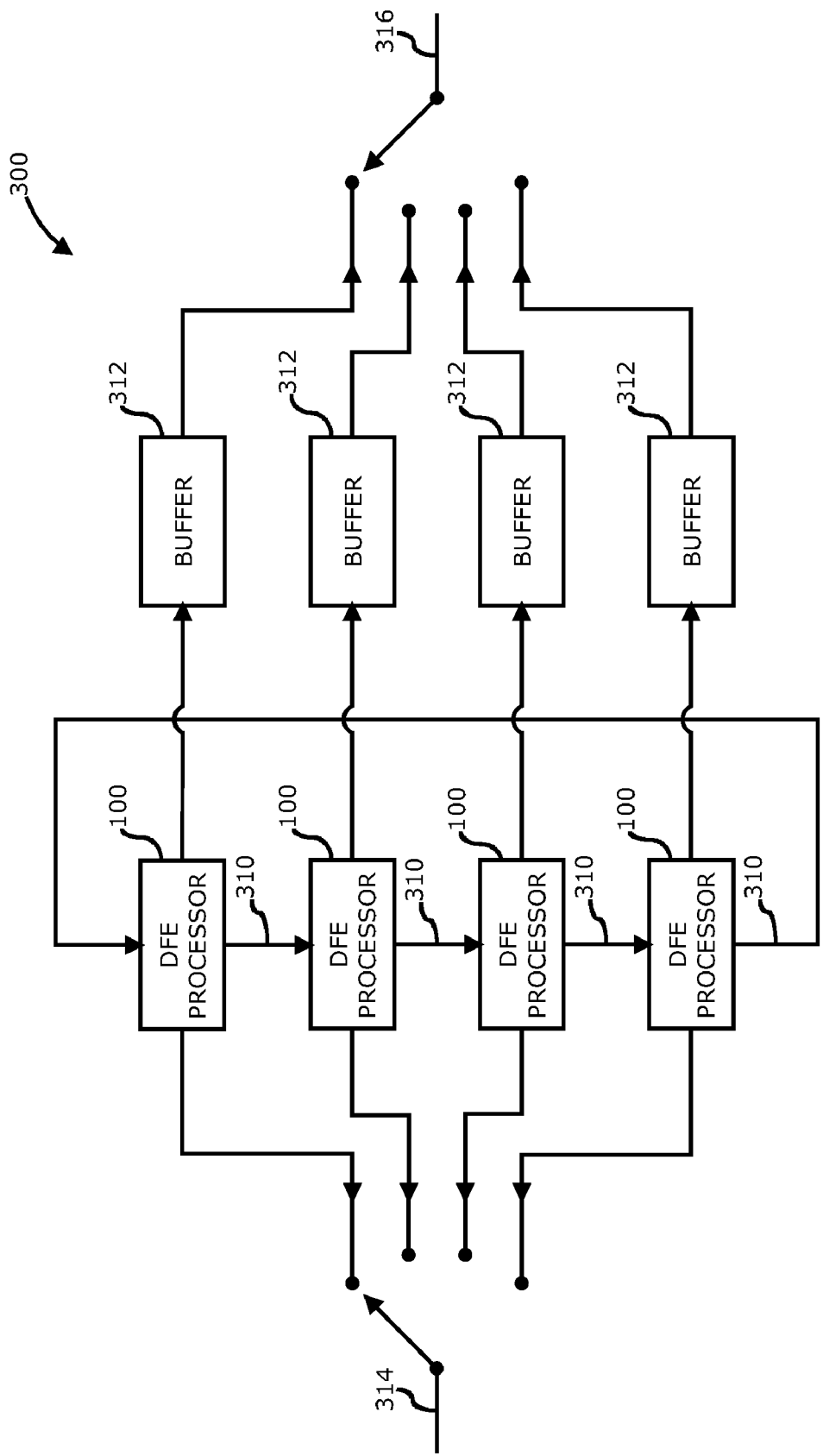
FIG. 3 is a block diagram of a DFE system in accordance with one or more embodiments.

Referring now to FIG. 3, a block diagram of a DFE system in accordance with one or more embodiments will be discussed. As shown in FIG. 3, DFE system 300 may comprise four DFE processors 100 in a parallel arrangement. It should be noted that four parallel DFE processors 100 are shown merely as an example, and other numbers of DFE processors 110 may be connected in a parallel arrangement as shown in FIG. 3, and the scope of the claimed subject matter is not limited in this respect. In one or more embodiments, received signal 210 may be parallelized by selector 314 which provides received signal 314 to each DFE processor 100 in sequence over time so that a given DFE processor 100 may receive a selected portion of received signal 210 as indicated by the arrows 216, 218, and/or 220 as shown in FIG. 2 beginning at constellation points 228 of a first data block through the cyclic prefix 212 of the next data block until the beginning of the next constellation points 228 at which point selector 314 feeds received signal 210 to the next DFE processor 100. In one or more embodiments, selector 314 switches from one DFE processor 100 to a subsequent DFE processor 100 every fixed number of samples, which may be equal to the block size in one or more embodiments, although the scope of the claimed subject matter is not limited in these respects.

In one or more embodiments, as shown in and described with respect to FIG. 1, a given DFE processor 100 will obtain the initial decisions not based on the data in its own input, but based on well-equalized data corresponding to cyclic prefix 212 obtained from a preceding DFE processor 100 via lines 310. The last DFE processor 100 in the group of parallel DFE processors 100 provides this equalized data corresponding to the cyclic prefix 212 that it processed to the first DFE processor 100, and so that the processing of received signal 210 may continue again with the first DFE processor 100. Such an arrangement of DFE system 300 as shown in FIG. 3 allows a given DFE processor 100 to sufficiently implement decision-feedback equalization with a sufficient initialization obtained from a previous DFE processor 100.

In some embodiments, the output of one or more DFE processors 100 optionally may be buffered via buffers 312. Selector 316 may then re-serialize the outputs of DFE processors to provide proper serial stream that is well equalized. Such re-serialization via selector 316 may be implemented in one or more embodiments, however one or more alternative embodiments may be implemented in which one block is processed at time at the outputs of DFE processors 100 wherein re-serialization may not be required, and the scope of the claimed subject matter is not limited in this respect.

Figure 4:
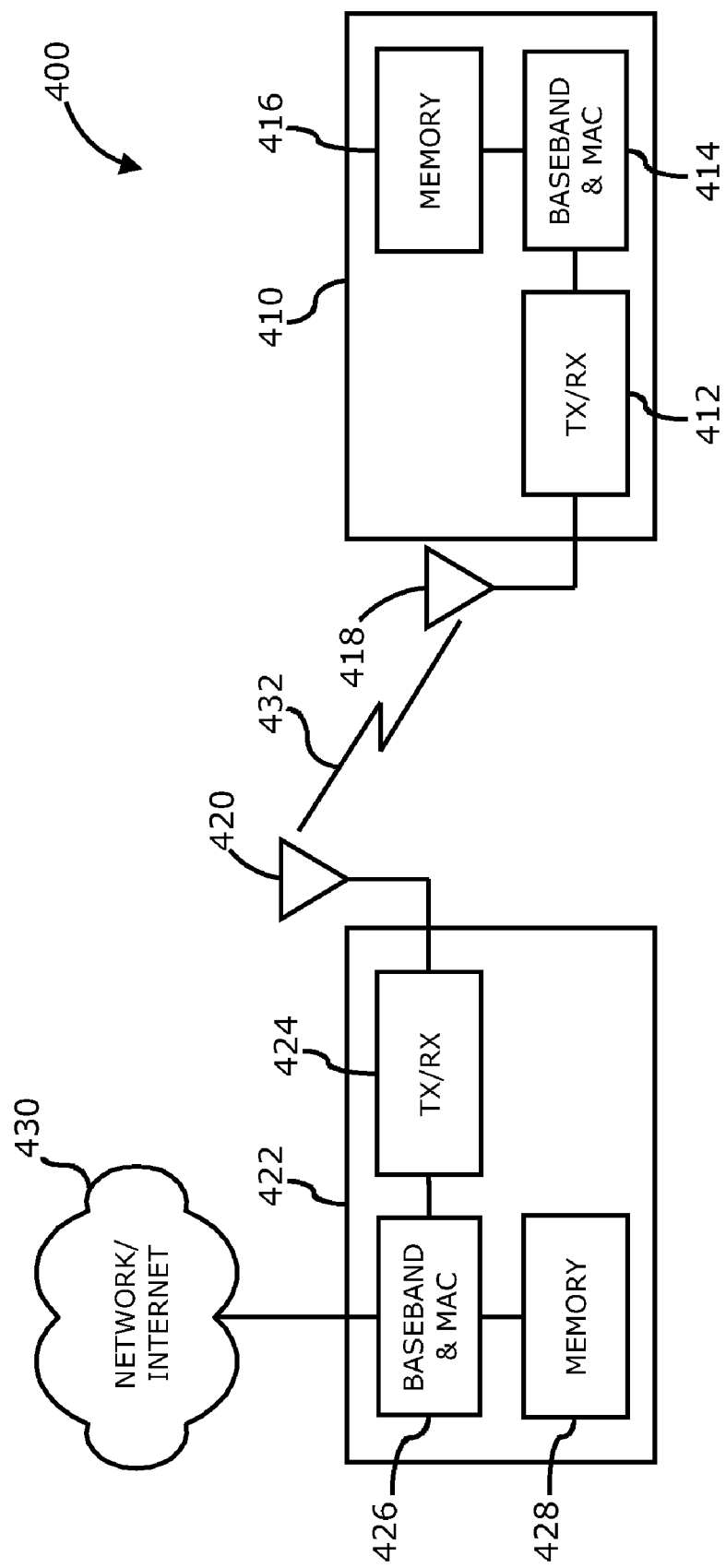
FIG. 4 is a block diagram of a wireless local area network or cellular network communication system showing one or more network devices capable of utilizing a lower processing rate decision feedback equalizer for a higher rate carrier signal in accordance with one or more embodiments.

Referring now to FIG. 4, a block diagram of a wireless local area or cellular network communication system showing one or more network devices capable of utilizing a lower processing rate decision feedback equalizer for a higher rate carrier signal in accordance with one or more embodiments will be discussed. In one or more embodiments, method 200 of FIG. 2 and/or DFE system 300 may be implanted by either access point 422 and/or by mobile unit 410 on received signals 210. In one or more embodiments, such received signals 210 may comprise high-definition video signals, although the scope of the claimed subject matter is not limited in this respect. In particular, at in a Wireless Personal Area Network (WPAN) embodiment, access point 422 may comprise a personal network coordinator (PNC), and/or mobile unit 410 may comprise a multimedia internet device (MID) such as a laptop computer, handheld device such as a personal digital assistant (PDA), and so on, and the scope of the claimed subject matter is not limited in these respects. Thus, in one or more embodiments, terminology for WLAN type networks may find analogs in WPAN networks, and the scope of the claimed subject matter is not limited in these respects.

In the communication system 400 shown in FIG. 4, a mobile unit 410 may include a wireless transceiver 412 to couple to an antenna 418 and to a processor 414 to provide baseband and media access control (MAC) processing functions. In 60 GHz communications systems or the like, it expected that the antennas may be phased array antennas. Some devices may have a single antenna, and other devices may have antenna arrays or sectorized antennas. Furthermore, a device may include multiple subassemblies of antenna arrays. In one or more embodiments, mobile unit 410 may be a cellular telephone or an information handling system such as a mobile personal computer or a personal digital assistant or the like that incorporates a cellular telephone communication module, although the scope of the claimed subject matter is not limited in this respect. In one particular embodiment, a cellular telephone device may also include WLAN and/or WPAN functionality, and the scope of the claimed subject matter is not limited in this respect. Processor 414 in one embodiment may comprise a single processor, or alternatively may comprise a baseband processor and an applications processor, although the scope of the claimed subject matter is not limited in this respect. Processor 414 may couple to a memory 416 which may include volatile memory such as dynamic random-access memory (DRAM), non-volatile memory such as flash memory, or alternatively may include other types of storage such as a hard disk drive, although the scope of the claimed subject matter is not limited in this respect. Some portion or all of memory 416 may be included on the same integrated circuit as processor 414, or alternatively some portion or all of memory 416 may be disposed on an integrated circuit or other medium, for example a hard disk drive, that is external to the integrated circuit of processor 414, although the scope of the claimed subject matter is not limited in this respect.

Mobile unit 410 may communicate with access point 422 via wireless communication link 432, where access point 422 may include at least one antenna 420, transceiver 424, processor 426, and memory 428. In one embodiment, access point 422 may comprise a personal network coordinator of a wireless personal area network, access point 422 may be a base station of a cellular telephone network, and in an alternative embodiment, and/or access point 422 may be a an access point or wireless router of a wireless local or personal area network, although the scope of the claimed subject matter is not limited in this respect. In an alternative embodiment, access point 422 and optionally mobile unit 410 may include two or more antennas in a phased array format, such as an antenna array having 36 or so antenna elements, for example to provide a spatial division multiple access (SDMA) system or a multiple input, multiple output (MIMO) system, although the scope of the claimed subject matter is not limited in this respect. Access point 422 may couple with network 430 so that mobile unit 410 may communicate with network 430, including devices coupled to network 430, by communicating with access point 422 via wireless communication link 432. Network 430 may include a public network such as a telephone network or the Internet, or alternatively network 430 may include a private network such as an intranet, or a combination of a public and a private network, although the scope of the claimed subject matter is not limited in this respect.

Communication between mobile unit 410 and access point 422 may be implemented via a wireless personal area network (WPAN), for example a network compliant with a an Institute of Electrical and Electronics Engineers (IEEE) standard such as IEEE 802.15.3c, IEEE 802.11a, IEEE 802.11b, IEEE 802.11g, IEEE 802.11n, HiperLAN-II, IEEE 802.16e, and so on, and further may be compliant with a Wireless High-Definition (HD) video or Wireless High-Definition Multimedia Interface (HDMI) standard or the like, although the scope of the claimed subject matter is not limited in these respects. In another embodiment, communication between mobile unit 410 and access point 422 may be at least partially implemented via a cellular communication network compliant with a Third Generation Partnership Project (3GPP or 3G) standard, although the scope of the claimed subject matter is not limited in this respect. In one or more embodiments, antenna 418 may be utilized in a wireless sensor network or a mesh network, although the scope of the claimed subject matter is not limited in this respect.

Although the claimed subject matter has been described with a certain degree of particularity, it should be recognized that elements thereof may be altered by persons skilled in the art without departing from the spirit and/or scope of claimed subject matter. It is believed that the subject matter pertaining to lower processing rate decision feedback equalizer for higher rate carrier signal and/or many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. A method, comprising:
   receiving a signal to be processed;
   parallelizing the received signal into two or more paths;
   DFE processing the received signal on the two or more paths to result in a processed signal; and
   sending a portion of the processed signal to a subsequent path wherein DFE processing performed on the subsequent path may use the portion of the processed signal as initialization for DFE processing on the subsequent path.

2. A method as claimed in claim 1, wherein the portion of the processed signal comprises a predetermined cyclic prefix.

3. A method as claimed in claim 1, further comprising re-serializing the processed signals from the two or more paths into a serialized processed signal.

4. A method as claimed in claim 1, said DFE processing comprising:
- feed-forward processing a portion of the received signal for the two or more paths;
- demapping the feed-forward processed signal; and
- feed-backward processing the demapped signal and providing the feed-backward processed signal to said demapping summed with said feed-forward processing wherein an output of said DFE processing is obtained from the sum.

5. A method as claimed in claim 4, said feed-forward processing being performed in frequency domain.

6. A method as claimed in claim 1, further comprising buffering the DFE processed signals on the two or more paths.

7. A method as claimed in claim 1, said performing DFE processing comprising processing the portion of the received signal starting with a constellation of a first data block, a cyclic prefix of a next data block, and a portion of the next data block up to a constellation in the next data bock.

8. An article of manufacture comprising a storage medium having instructions stored thereon that, if executed, result in:
- receiving a signal to be processed;
- parallelizing the received signal into two or more paths;
- DFE processing the received signal on the two or more paths to result in a processed signal; and
- sending a portion of the processed signal to a subsequent path wherein DFE processing performed on the subsequent path may use the portion of processed signal as initialization for DFE processing on the subsequent path.

9. An article of manufacture as claimed in claim 8, wherein the portion of the processed signal comprises a predetermined cyclic prefix.

10. An article of manufacture as claimed in claim 8, wherein the instructions, if executed, further result in re-serializing the processed signals from the two or more paths into a serialized processed signal.

11. An article of manufacture as claimed in claim 8, wherein the instructions, if executed, further result in further processing the processed signals from the two or more branches without re-serializing the processed signals.

12. An article of manufacture as claimed in claim 8, said DFE processing comprising:
- feed-forward processing a portion of the received signal for the two or more paths;
- demapping the feed-forward processed signal; and
- feed-backward processing the demapped signal and providing the feed-backward processed signal to said demapping summed with said feed-forward processing wherein an output of said DFE processing is obtained from the sum.

13. An article of manufacture as claimed in claim 8, wherein the instructions, if executed, further result in buffering the DFE processed signals on the two or more paths.

14. An article of manufacture as claimed in claim 8, said performing DFE processing comprising processing the portion of the received signal starting with a constellation of a first data block, a cyclic prefix of a next data block, and a portion of the next data block up to a constellation in the next data bock.

15. An apparatus, comprising:
- a baseband processor;
- a radio-frequency receiver coupled to the baseband processor capable of receiving a signal transmitted from a remote device, the baseband processor comprising:
- a parallelizer to parallelize a received signal into two or more paths;
- two or more DFE processors to process the received signal on the two or more paths to result in a processed signal; and
- wherein the one of the two or more DFE processors is capable of sending a portion of the processed signal to a subsequent DFE processor on a subsequent path wherein the subsequent DFE processor on the subsequent path may use the portion of processed signal as initialization for processing on the subsequent path.

16. An apparatus as claimed in claim 15, wherein the portion of the processed signal comprises a predetermined cyclic prefix.

17. An apparatus as claimed in claim 15, further comprising a re-serializer to re-serialize the processed signals from the two or more paths into a serialized processed signal.

18. An apparatus as claimed in claim 15, said DFE processor comprising:
- a feed-forward filter to process a portion of the received signal for the two or more paths;
- a demapper to demap the feed-forward processed signal;
- a feed-backward filter to process the demapped signal; and
- a summer to provide the feed-backward processed signal to the demapper summed with the feed-forward processed signal wherein an output of the DFE processing is obtained from the summer.

19. An apparatus as claimed in claim 15, further comprising a buffer on the two or more paths to buffer the DFE processed signals.

20. An apparatus as claimed in claim 15, wherein the DFE processor is capable of processing the a portion of the received signal starting with a constellation of a first data block, a cyclic prefix of a next data block, and a portion of the next data block up to a constellation in the next data bock.

* * * * *

UNITED STATES PATENT AND TRADEMARK OFFICE
CERTIFICATE OF CORRECTION

PATENT NO.         : 7,929,598 B2
APPLICATION NO.    : 11/968075
DATED              : April 19, 2011
INVENTOR(S)        : Ilan Sutskover et al.

It is certified that error appears in the above-identified patent and that said Letters Patent is hereby corrected as shown below:

In column 8, line 48, in Claim 20, after "processing" delete "the".

Signed and Sealed this
Twenty-third Day of August, 2011

David J. Kappos
*Director of the United States Patent and Trademark Office*